(12) United States Patent
Denisov et al.

(10) Patent No.: US 12,741,321 B2
(45) Date of Patent: Sep. 22, 2026

(54) STORAGE DEVICE FOR CARTRIDGE CONTAINERS IN AN INSTALLATION FOR PRODUCING THREE-DIMENSIONAL COMPONENTS

(71) Applicant: One Click Metal GmbH, Tamm (DE)

(72) Inventors: Roman Denisov, Ludwigsburg (DE); Björn Ullmann, Bönnigheim (DE)

(73) Assignee: One Click Metal GmbH, Tamm (DE)

( * ) Notice: Subject to any disclaimer, the term of this patent is extended or adjusted under 35 U.S.C. 154(b) by 761 days.

(21) Appl. No.: 17/814,928

(22) Filed: Jul. 26, 2022

(65) Prior Publication Data

US 2023/0030908 A1 Feb. 2, 2023

(30) Foreign Application Priority Data

Jul. 26, 2021 (DE) ..................... 10 2021 119 305.2

(51) Int. Cl.
*B22F 12/50* (2021.01)
*B22F 10/28* (2021.01)
*B33Y 30/00* (2015.01)
*B33Y 40/00* (2020.01)

(52) U.S. Cl.
CPC .............. *B22F 12/50* (2021.01); *B33Y 30/00* (2014.12); *B33Y 40/00* (2014.12); *B22F 10/28* (2021.01)

(58) Field of Classification Search
CPC ..... B29C 64/307; B29C 64/32; B29C 64/321; B22F 12/50
See application file for complete search history.

(56) References Cited

U.S. PATENT DOCUMENTS 10,723,076 B2 * 7/2020 Chanclon Fernandez .................. B22F 12/50
11,673,331 B2 * 6/2023 Swier .................... B29C 64/321 425/375
12,017,277 B2 * 6/2024 Nakamura ............ B29C 64/209
12,151,436 B2 * 11/2024 Olausson ................ B22F 10/68
2019/0061250 A1 * 2/2019 Chanclon Fernandez .................. B29C 64/255

(Continued)

FOREIGN PATENT DOCUMENTS

DE 102016218491 A1 * 3/2018
DE 102016014513 A1 6/2018
DE 102019130951 A1 * 5/2021 .............. B22F 10/00

*Primary Examiner* — Xiao S Zhao
*Assistant Examiner* — Nicholas J Chidiac
(74) *Attorney, Agent, or Firm* — Renner, Otto, Boisselle & Sklar, LLP

(57) ABSTRACT

A storage device for cartridge containers in a installation for producing three-dimensional component by selective solidification by means of a beam acting on a powdered building material, having a magazine which has a plurality of storage locations for receiving cartridge containers and which can be transferred at least to an emptying/feeding station and to a loading/unloading station, having a holding device provided at each storage location, by means of which the cartridge container is fixed to the storage location in an exchangeable manner, having an opening provided in the storage location, by means of which a docking port of the emptying/feeding station can be connected to the cartridge container, and having a drive which activates a change of the storage locations by a displacement movement of the magazine at least between an emptying/filling position of the emptying/feeding station and the loading/unloading station.

15 Claims, 6 Drawing Sheets

(56) References Cited

U.S. PATENT DOCUMENTS

Figure 1:
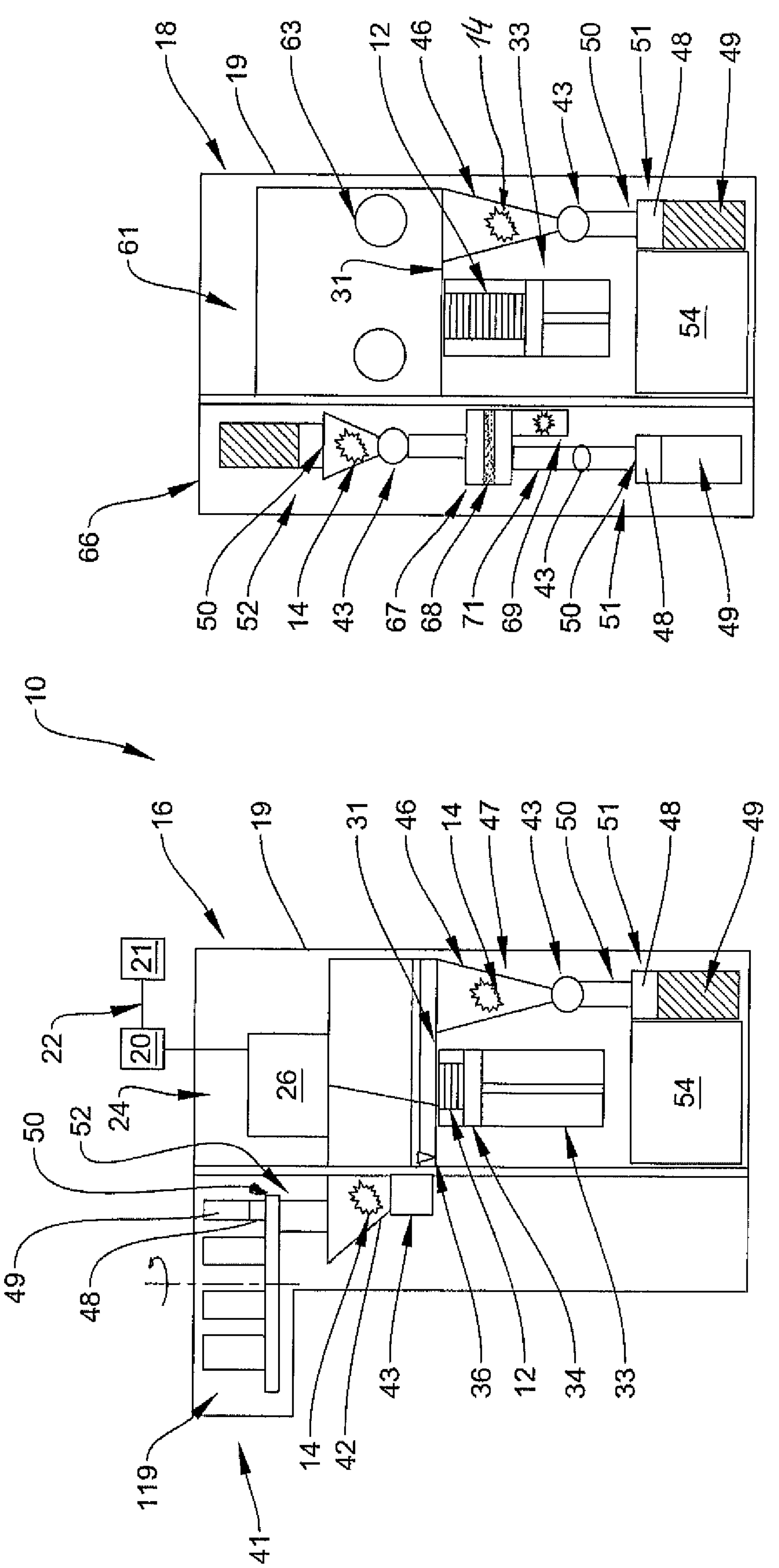

| | | | | |
|---|---|---|---|---|
| 2020/0230941 | A1* | 7/2020 | Swier | G03G 15/224 |
| 2022/0118524 | A1* | 4/2022 | Nakamura | B29C 64/25 |
| 2022/0134666 | A1* | 5/2022 | Olausson | B22F 12/00 451/38 |
| 2022/0402037 | A1* | 12/2022 | Blaser | B22F 12/38 |
| 2023/0028743 | A1* | 1/2023 | Denisov | B22F 12/50 |
| 2024/0033826 | A1* | 2/2024 | Buller | B33Y 40/20 |

* cited by examiner

STORAGE DEVICE FOR CARTRIDGE CONTAINERS IN AN INSTALLATION FOR PRODUCING THREE-DIMENSIONAL COMPONENTS

This application claims priority of German Application No. 10 2021 119 305.2, filed Jul. 26, 2021, which is hereby incorporated herein by reference in its entirety.

The invention relates to a storage device for cartridge containers in an installation for producing three-dimensional components by successively solidifying layers of a powdered building material.

An installation for producing three-dimensional components by successively solidifying layers of the powdered building material is known from DE 10 2019 130 951 A1. For supplying the installation with powdered building material and also for emptying the installation of powdered building material, cartridges which can be positioned in cartridge slots are known. Such cartridges comprise a container and also a cartridge closure member which is arranged thereon in a fixed and unreleasable manner. The cartridges arranged side by side in a stationary row in the cartridge slots are gradually opened in order to feed powdered building material to a powder collecting funnel which extends over all the cartridge slots.

The object underlying the invention is to propose a storage device for an installation for producing three-dimensional components by successively solidifying layers of a powdered building material, by means of which the installation can operate autonomously during a production cycle without additional handling by a worker.

This object is achieved by a storage device for an installation for producing three-dimensional components by successively solidifying layers of a powdered building material, which installation has a magazine with a plurality of storage locations for receiving cartridge containers which can be transferred at least to a loading/unloading station and a feed/emptying station, wherein there is provided in each storage location a holding device by means of which the cartridge container is fixed to the storage location in an exchangeable manner and each storage location has an opening which can be positioned at a connection point of a feeding station or emptying station and a docking port of the feeding station or emptying station can be connected to the cartridge container in a filling/emptying position, and which comprises a drive which activates a change of the storage locations by a displacement movement of the magazine at least between the loading/unloading station and the feed/emptying station. This allows cartridge containers stored in the magazine to be filled or emptied in succession. If the storage device is equipped with filled cartridge containers, the number of cartridge containers corresponding to the number of storage locations can be emptied in succession, so that even large-volume components can be processed without stopping the installation or without an additional operation of filling the storage device with fresh cartridge containers. This storage device can also be associated with an emptying station, so that building material that has not been solidified during production of the three-dimensional component can be received.

It is preferably provided that the magazine has at least two storage locations and each storage location of the magazine can be transferred to the loading and unloading station and to the feed/emptying station. Increased automation can thus take place, since, for example, the cartridge containers arranged in the loading and unloading station can be exchanged by a worker or by a handling device.

Furthermore, it is preferably provided that, where there are more than two storage locations in the magazine, the loading and unloading station is provided downstream of the feed/emptying station. Exchange of the cartridge container can thus correspondingly be carried out immediately after the cartridge container has been emptied or filled.

Furthermore, it is preferably provided that a plurality of storage locations for keeping cartridge containers available are provided between the loading and unloading station and the feed/emptying station. The number of storage locations for keeping cartridge containers available can be designed in dependence on the capacity of the installation.

There is preferably provided in the feed/emptying station an interrogator device by means of which the presence of a cartridge container and/or a marking on the cartridge container can be detected. The degree of automation and the process reliability can thus be increased. For example, by interrogation of the marking it is possible, in the case of filled cartridge containers, to read out what building material is in the cartridge container and whether this building material matches the building material to be processed in a process chamber of a building station.

A further advantageous embodiment of the storage device provides that each storage location in the magazine has a holding device for receiving a connecting device which can be fixed in the storage location by a connection side, wherein this connection side is provided on the connecting device opposite the cartridge container. This connecting device has a standardized connection point, so that it can also be connected directly to further feeding stations and/or emptying stations of the installation.

The cartridge container is preferably releasably fastened to the connecting device. Thus, a number of connecting devices corresponding to the number of storage locations in the magazine can be kept available, wherein only the cartridge containers for re-filling can be sent out. A small number of connecting devices is thus sufficient for equipping the magazine.

Furthermore, it is preferably provided that the connecting device has a housing with a cartridge receiver and a connection port opposite the cartridge receiver and facing the connection side, wherein the connection port comprises a passage which can be activated for opening and closing by a closure member. The opening of the cartridge container is thus closed by the connecting device and remains closed by the closure member in the passage of the connection port until transfer of the powdered building material in the emptying station is activated.

Furthermore, the closure member is preferably in the form of a closure flap arranged in the passage. This permits a simple and constructive form and also activation for opening and closing of the passage.

Advantageously, the closure flap can be activated outside the housing of the connecting device by a drive which can be positioned on a driver member which actuates the pivot pin. This connecting device can thus be used for automatic emptying or filling of the cartridge container.

Furthermore, the pivot pin of the closure flap is preferably mounted in the housing, and the pivot pin is sealed facing the passage by at least one seal. Powdered building material can thus be prevented from escaping to the outside via the pivot pin leading outside the housing.

At the front end of the connection port there is preferably provided an internal insertion chamfer which merges into the passage in the connection port, which is preferably of cylindrical form. Simple positioning of the connection port on a docking port of an emptying station can thus be provided, for example, in that the connection port engages externally around the docking port.

Furthermore, the connection port is preferably surrounded by a free—preferably U-shaped—annular space which is configured to be open to the connection side of the housing of the connecting device.

A docking port of a feeding station, for example, which engages the outer circumference of the connection port can thus be fitted to the connection port. This has the advantage that the powdered building material is able to fall or be transferred freely through the passage and the opening of the connection port into the docking port without powdered building material accumulating in the connection region.

Furthermore, at least one seal which surrounds the connection port is preferably provided on the outer circumference of the connection port and facing into the annular space. Simple positioning of the connecting device with the connection port at a docking port of the feeding station or emptying station can thus be made possible, and at the same time a sealing interface can be created.

The holding devices provided at the storage locations of the magazine preferably form a plug/latching connection or a bayonet closure with the housing of the connecting device. Exact alignment of the connecting device within the storage location is thus made possible. At the same time, removal of the connecting device from the storage location is prevented. This is advantageous in particular in the case of an upside-down arrangement of the storage device relative to an emptying station.

Furthermore, it is preferably provided that the feeding station has a docking port which is oriented facing the magazine and comprises a passage in which a closure member for opening and closing the passage is provided. Thus, after the connection port of the connecting device has been connected to the docking port, a lock can be created in order to allow controlled delivery of the powdered building material from the cartridge container into a powder storage funnel or into a metering device, for example.

Furthermore, it is preferably provided that the docking port of the feeding station is arranged in a lower starting position in a guide and, after the filled cartridge container has been positioned in the emptying position, the docking port is connected to the connection port of the connecting device and preferably the docking port, by means of a displacement movement towards the connection port, is fitted to and engages over the connection port.

The same can be provided for the emptying station. The emptying station preferably comprises a docking port which is oriented facing the magazine and comprises a passage in which a closure member for opening and closing the passage is provided.

The docking port of the emptying station is preferably arranged in an upper starting position in the guide and, after the empty cartridge container has been positioned in the filling position, the docking port is connected to the docking port of the connecting device and preferably the docking port, by means of a displacement movement towards the connection port, is inserted into the connection port. An undercut-free interface can thus be created in order to avoid the accumulation of powdered building material at or in the interface between the docking port and the connection port.

Figure 2:
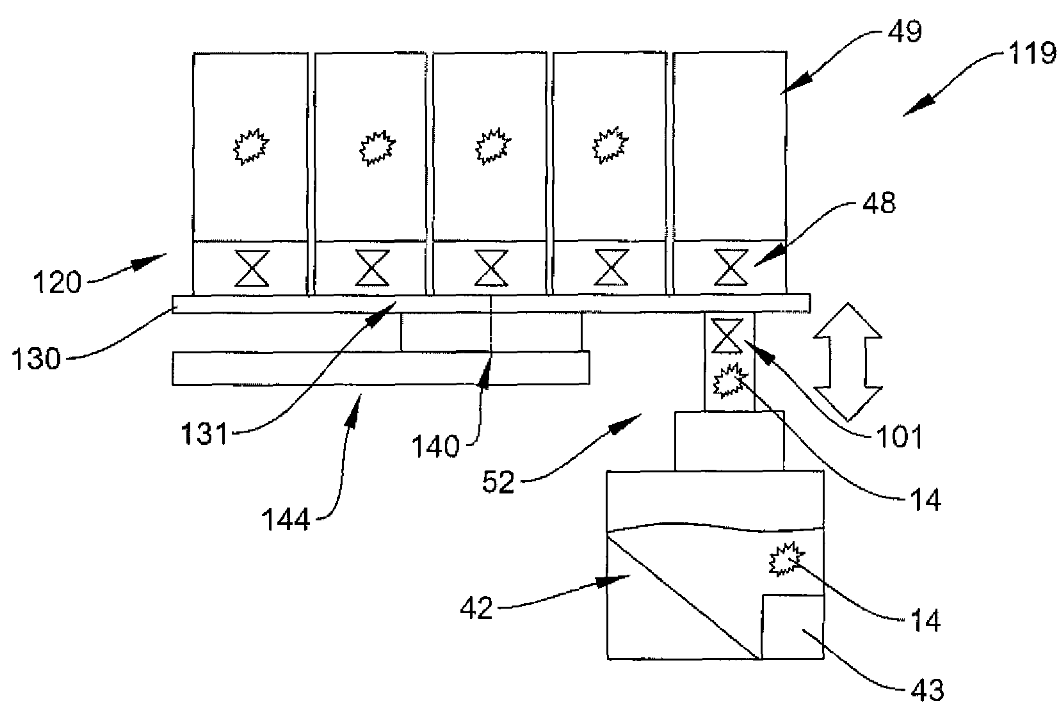
Figure 3:
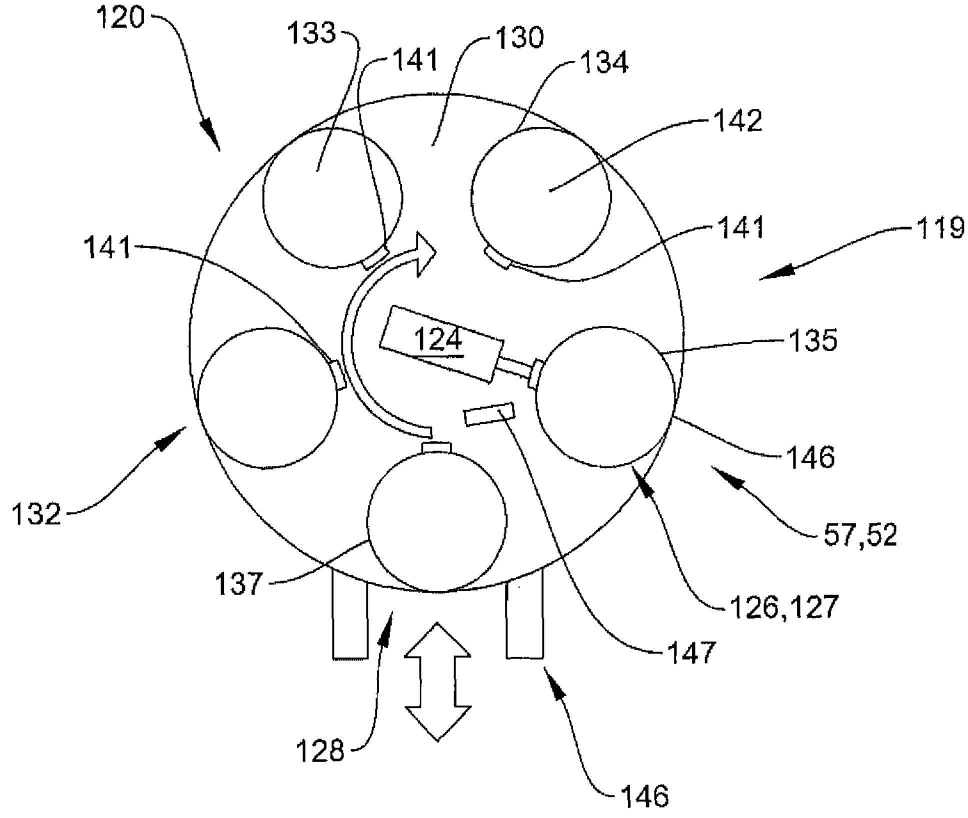
Figures 4, 5:
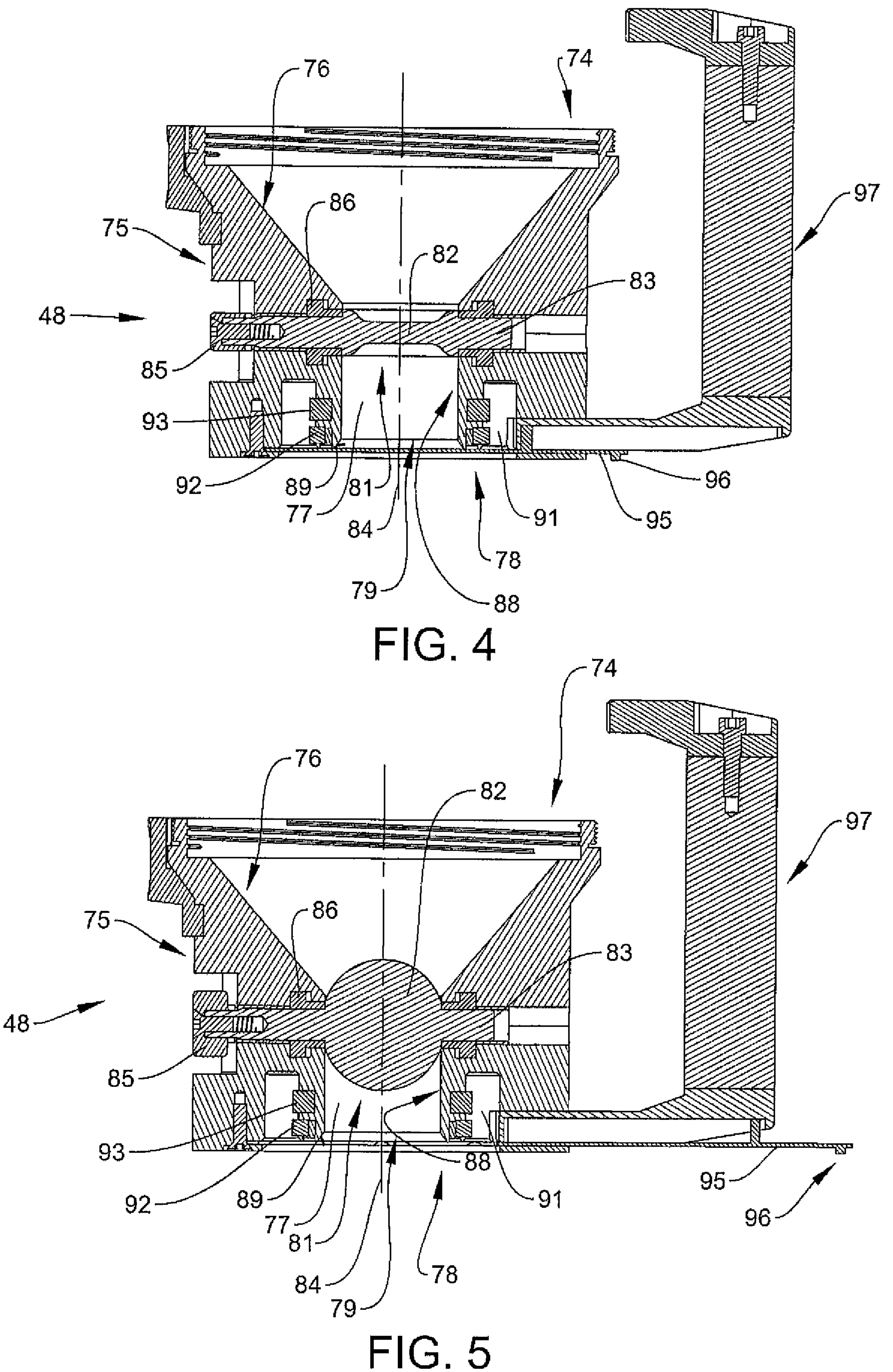
Figure 6:
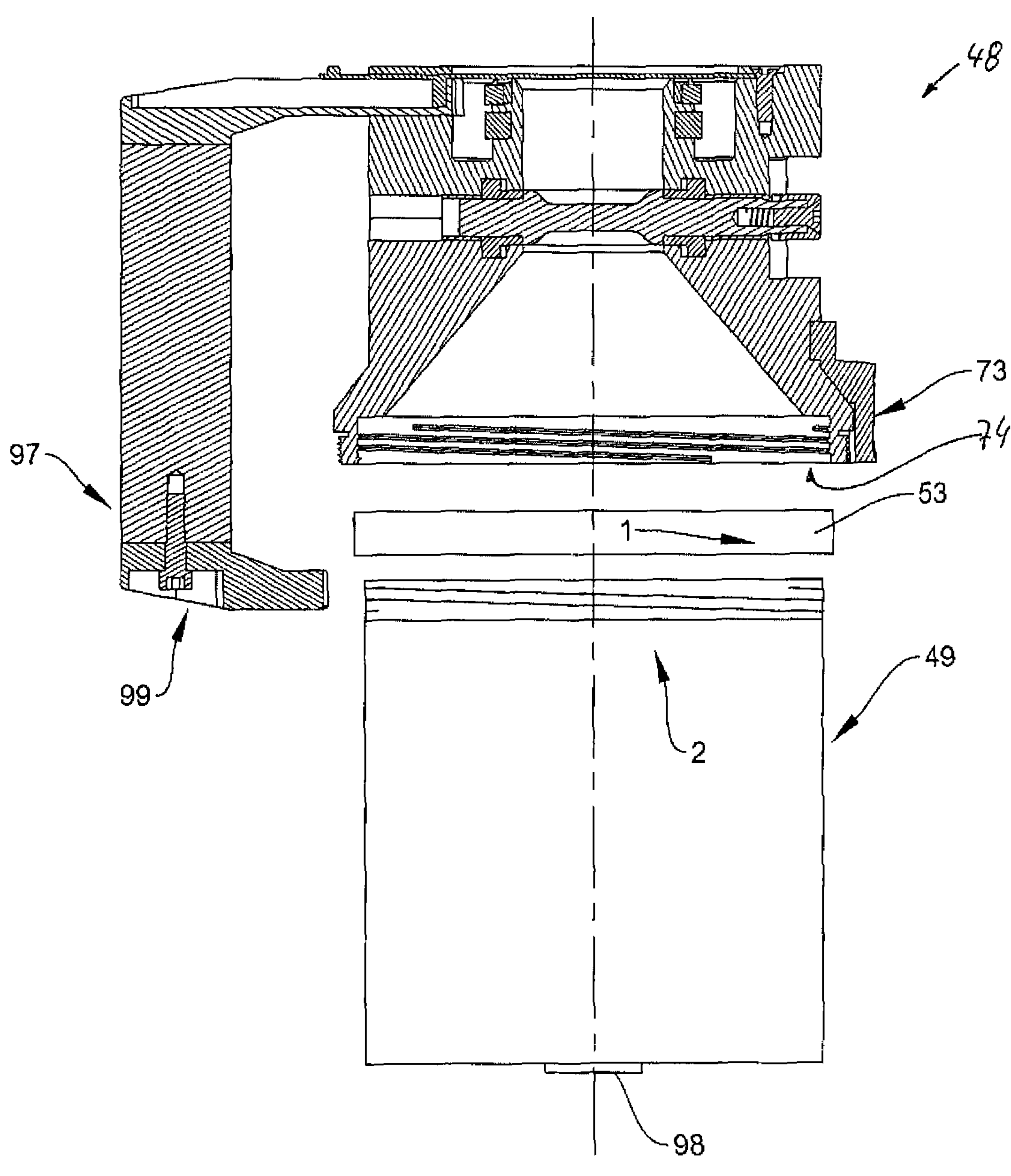
Figure 7:
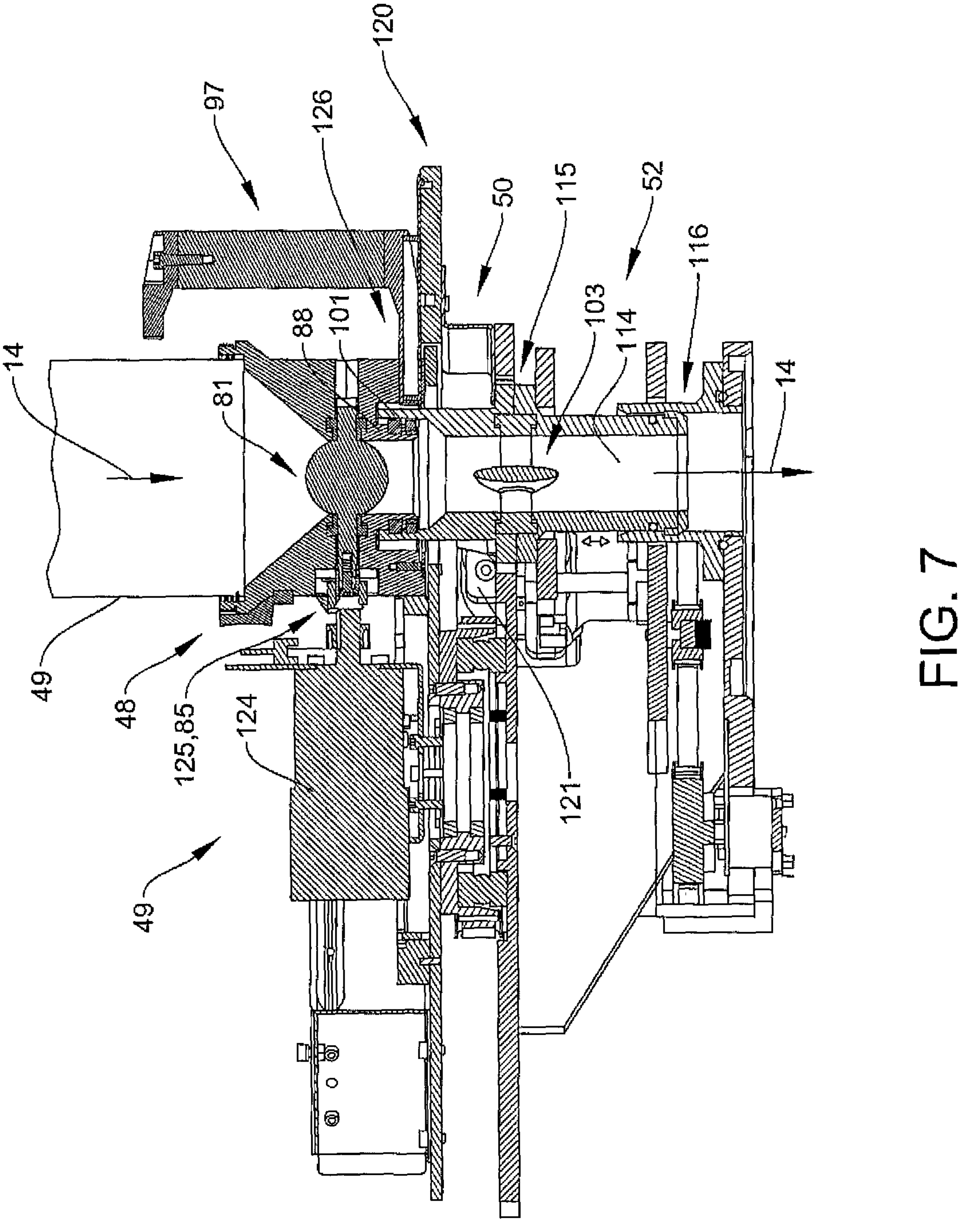
Figure 8:
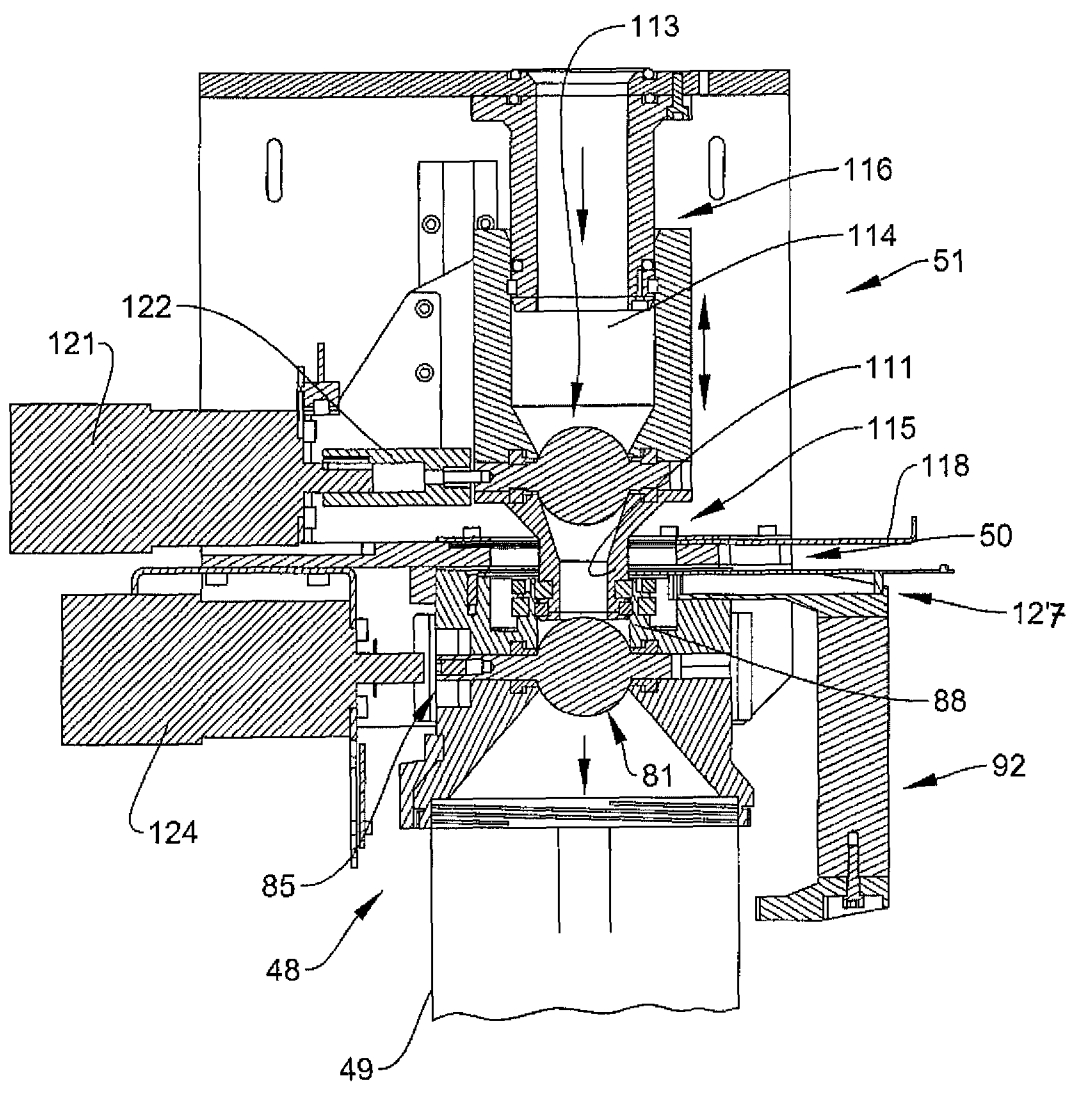

The invention and further advantageous embodiments and further developments thereof will be described and explained in detail in the following text by means of the examples shown in the drawings. The features which are to be found in the description and the drawings can be applied according to the invention individually on their own or in a plurality in any desired combination. In the figures:

FIG. 1 is a schematic view from the front of an installation for producing three-dimensional components having a building station, an unpacking station and a sieve station, FIG. 2 is a schematic enlarged view of a storage device for cartridge containers in the installation according to FIG. 1, FIG. 3 is a schematic view from above of the storage device according to FIG. 2, FIG. 4 is a schematic sectional view of a connecting device for receiving a cartridge container and for positioning in the installation according to FIG. 1, FIG. 5 is a schematic sectional view of the connecting device according to FIG. 4 with an open closure member, FIG. 6 is a schematic side view of the connecting device according to FIG. 4 for equipping with a cartridge container, FIG. 7 is a schematic sectional view of the connecting device in conjunction with the feeding station, and FIG. 8 is a schematic sectional view of the connecting device in conjunction with the emptying station.

FIG. 1 shows, schematically, a side view of an installation 10 for producing a three-dimensional component 12 by successively solidifying layers of a powdered building material 14. This installation 10 comprises, for example, a building station 16 and an unpacking station 18. This building station 16 and the unpacking station 18 each comprise a housing 19 and are provided separately from one another. Alternatively, this building station 16 and the unpacking station 18 can also be provided in a common housing 19 of the installation 10.

The building station 16 comprises a beam source 21, for example in the form of a laser source. This beam source 21 emits a beam 22, in particular a laser beam 22, which is fed via a beam guide to a processing head 26 of a process chamber 24. The beam 22 is directed via the processing head 26 onto the building material 14. This processing head 26 can be arranged on a linear axis system. This linear axis system 28 can be in the form of a two-axis system, so that the processing head 26 is movable in the process chamber 24 in the X-/Y-plane parallel to and above a work surface 31. Alternatively to the processing head 26, a scanner device can also be associated with the process chamber 24. The scanner device comprises a controllable scanner mirror by means of which the beam 21 is directed onto the building material 14.

In the work surface 31 there is a building module 33 within which a substrate plate 34 is guided so as to be movable up and down. The three-dimensional component 12 is produced on this substrate plate 34 by selectively solidifying the powdered building material 14.

Above the work surface 31 there is preferably provided an application and levelling device 36. This application and levelling device 36 travels over the work surface 31. In this manner, on the one hand the powdered building material 14 can be applied into the building module 33 and at the same time the excess building material 14 which has been applied can be discharged from the building module 33 in a collecting device 46 by the levelling device.

The building material 14 preferably consists of a metal powder or ceramics powder. Other materials which are suitable and employed for laser melting and/or laser sintering can also be used. The process chamber 24 is preferably hermetically sealed. For producing the three-dimensional component 12, the process chamber is filled with protecting gas or an inert gas in order to avoid oxidation on melting of the building material 14.

The building station 16 further comprises a powder storage device 41. This powder storage device 41 has a powder storage funnel 42 which is preferably equipped with a fill level sensor in order to detect the stored level of building material 14. Via a metering device 43, a predetermined amount of building material 14 is removed from the powder storage funnel 42 and fed to the application and levelling device 36 in the process chamber 24.

The building material 14 that has not solidified after the exposure process is transferred by means of the application and levelling device 36 into a collecting device 46. This collecting device 46 preferably comprises a collecting funnel 47, the opening of which is integrated in the work surface 31 or lies in the work surface 31. This collecting device 46 feeds the processed building material 14 introduced via the application and levelling device 36 to a downstream metering device 43.

Associated with this metering device 43 downstream is a connection point 50 of an emptying station 51, which is provided for connection of a connecting device 48 to which a cartridge container 49 can be fastened. This connecting device 48 will be described hereinbelow in FIGS. 4 and 5. Via the metering device 43, a predetermined amount of processed building material 14 is transferred into the cartridge container 49.

A storage place 54 for further cartridge containers 49 and/or connecting devices 48 can be provided in the housing 19 of the building station 16. Both filled and empty cartridge containers 49 can be stored in this storage place 54.

"Fresh building material" 14 is understood as being building material 14 that is for the first time provided for the production of a three-dimensional component 12 and fed to the process chamber 24 for the process of producing the three-dimensional component 12.

"Processed building material" 14 is understood as being powdered building material 14 that has been fed to the process chamber 24 and was not solidified by the selective solidification by means of the beam 22. This unsolidified powdered building material 14 is guided out of the process chamber 24 by the application and levelling device 36.

"Cleaned building material" 14 is understood as being building material 14 that, starting from processed building material, has been cleaned, for example in a sieve station. The processed building material is thereby freed of oversized impurities and the like. This cleaned building material can again be fed to the building station 16 for a work process.

The building station 16 can further comprise in the powder storage device 41 a connection point 50 of a feeding station 52 for at least one connecting device 48 with the cartridge container 49. This is shown hereinbelow in FIG. 5.

The unpacking station 18 comprises an unpacking chamber 61 in which the building module 33, which for removal from the process chamber 24 is preferably closed by a cover, can be inserted in order subsequently to be emptied in the unpacking station 18. The substrate plate 34 with the component 12 is removed from the building module 33 and cleaned of unsolidified building material 14 in the unpacking chamber 61. The processed building material 14 which accumulates in the unpacking chamber 61 on a work surface 31 is transferred to a collecting device 46, which can be configured analogously to the collecting device 46 of the building station 16. Via the metering device 43, processed building material 14 is fed to the connection point 50 of the emptying station 51. A connecting device 48 which receives an empty cartridge container 49 can be fastened to the connection point 50. This cartridge container 49 is filled with processed building material 14.

Openings 63 with a glove port can be provided in the unpacking chamber 61 for freeing the component 12 of loose building material 14 and feeding the loose building material to the collecting device 46. A suction device for cleaning the component 12 and/or the work surface 31 can also be provided.

The cartridge container 49 filled with the processed building material 14 is fed to a sieve station 66. This sieve station 66 can be integrated in the unpacking station 18. The sieve station 66 can also be integrated in the building station 16. The sieve station 66 can further be arranged so that it is isolated and separate from the building station 16 and the unpacking station 18. The building station 16, the unpacking station 18 and the sieve station 66 can also form a common installation in a housing 19.

The sieve station 66 comprises at least one connection point 50 for receiving the connecting device 50 at a feeding station 52, to which the connecting device 48 with the cartridge container 49 can be fastened. The processed building material 14 delivered by the cartridge container 49 through connecting device 50 is preferably fed by means of a metering device 43, in particular a metering screw, to a sieve device 67. This sieve device 67 comprises a sieve 68 which can preferably be excited by means of ultrasonic frequencies or low frequencies. The processed powdered building material 14 can thereby be cleaned. For example, coarse particles or oversized particles and/or impurities can be retained by the sieve 68 and transferred to an oversized-particle container 69. The processed powdered building material 14, which is free of oversized particles and/or impurities, is discharged as cleaned building material 14 via an outlet opening 71. This further outlet opening 71 opens into a connection point 50 of an emptying station 51, to which the connecting device 48 with an empty cartridge container 49 arranged thereon can be fastened. The cartridge container 49 serves to receive the processed and cleaned powdered building material 14.

The connecting device 48 with the cartridge container 48 filled with the processed and cleaned building material 14 is then conveyed to the powder storage device 41 again in order to supply the powder storage device 41 with building material 14.

The term "feeding station" 52 is understood as meaning that the connecting device 48 with a cartridge container 49 filled with building material 14 can be connected to this feeding station 52 so that the building material 14 provided in the cartridge container 49 can be fed to the respective station, in particular the building station 16 and the sieve station 66.

The term "emptying station" 51 is understood as meaning that a connecting device 48 with an empty cartridge container 49 can be connected to this emptying station 51 in order to transfer processed and/or cleaned building material 14 into the cartridge container 49. The processed and/or cleaned building material 14 can thus be guided out of the respective station, in particular the building station 16, the unpacking station 18 and/or the sieve station 66.

FIG. 2 shows a storage device 119 schematically and on an enlarged scale. This storage device 119 can be used as the powder storage device 41 in the installation 10 according to FIG. 1. FIG. 3 is a view of the storage device 119 according to FIG. 2 from above. The storage device 119 comprises a magazine 120, which according to the embodiment in FIGS. 2 and 3 is in the form of a rotating storage plate 130. Such a storage device 119 with a rotating storage plate 130 can also be referred to as a revolver system. At least two storage locations 131, 135 are provided in the storage plate 130. A plurality of storage locations 131, 132, 133, 134, 135 are preferably provided in an evenly distributed manner in the storage plate 130. Alternatively, it can be provided that the magazine 120 comprises, instead of a storage plate 130, a strip in which at least two storage locations 131, 135 are arranged one behind the other in a row.

The storage plate 130 is rotatably received by a bearing 140 and is driven in rotation by a motor 144. The storage device 119 can also be controlled by a controller in the installation 10.

Five storage locations 131, 132, 133, 134, 135, for example, are provided in the storage plate 130. Each storage location 131, 132, 133, 134, 135 can receive a cartridge container 49. Each of these storage locations 131, 132, 133, 134, 135 comprises an opening 142 and a holding device 141. A connecting device 48 which receives the cartridge container 49 can preferably be inserted into this opening 142. This connecting device 48 is shown by way of example in FIGS. 4 to 6. The holding device 141 engages on the housing 75 of the connecting device 48 and fixes the connecting device 48 in a defined position and orientation relative to the storage location 131, 132, 133, 134, 135.

The magazine 120 passes through multiple stations. Each of the storage locations 131, 132, 133, 134, 135 is positioned in a loading/unloading position 128 in a loading/unloading station 146. When seen in the direction of rotation of the magazine 120, storage locations 132, 133, 134 which are provided for keeping cartridge containers 49 available are then provided. The storage location 135 is associated with an emptying position 126 in a feeding station 52 or with a filling position 127 in an emptying station 51. The emptying station 51 or feeding station 52 is arranged immediately upstream of the loading and unloading station 146.

Associated with the emptying position 126 or filling position 127 is an interrogator device 147. This interrogator device 147 can be in the form of an optical detection device or a scanner or the like. Markings 98 provided on the cartridge container 49 can thus be detected.

A motor 124 (FIGS. 7 and 8) is further associated with the emptying position 126 or filling position 127. In a space-saving arrangement, this motor 124 can be provided within the storage locations 131, 132, 133, 134, 135.

In FIG. 2, the storage device 119 is associated by way of example with the feeding station 52. The building material 14 discharged from the filled cartridge container 49 is fed via the feeding station 52 to the powder storage funnel 42 and then to the metering device 43 or is fed directly to the metering device 43. The specific construction and the arrangement are shown and described in greater detail hereinbelow in FIG. 8.

This storage device 119 can also be associated with an emptying station 51. In this case, emptied cartridge containers 49 are first stored in the magazine 120 by the connecting device 48. These can be filled with processed building material 14 from the building station 16 or from the unpacking station 18 or with cleaned building material 14 from the sieve station 66. Metering devices 43 are preferably arranged upstream of the emptying station 51, so that a metered amount of building material 14 corresponding to the capacity of the cartridge containers 49 is delivered.

FIG. 4 shows a schematic sectional view of the connecting device 48. This connecting device 48 comprises a cartridge receiver 74 to which the cartridge container 49 can be fastened. The cartridge receiver 74 preferably has a thread, so that the cartridge container 49 can be fastened by a screw connection. Alternatively, further plug and/or latching connections or the like can also be provided as the cartridge receiver 74. This cartridge receiver 74 is arranged at the face end of a housing 75 of the connecting device 48. Adjoining the cartridge receiver 74 is a funnel 76, which opens in a passage 77. This passage 77 has an opening 79 on the connection side 78 of the connecting device 48. The side that can be connected to the connection point 50 in the building station 16 and/or unpacking station 18 and/or sieve device 67 forms the connection side 78.

A closure member 81 is provided in the passage 77. This closure member 81 is shown in a closed position in FIG. 2. A connection between the cartridge receiver 74 and the connection side 78 is thus blocked. The closure member 81 is preferably in the form of a pivotable closure flap 82 which is mounted in the housing 75 so as to be rotatable about a pivot pin 83. This pivot pin 83 is preferably oriented at a right angle to the longitudinal axis 84 of the passage 77. Outside the housing 75 there is provided a driver member 85 which can be fastened to the pivot pin 83. By means of this driver member 85, an opening and closing operation of the closure member 81 can be activated by means of a motor and a control device, for example. The pivot pin 83 is connected to the housing 75 in a sealing manner by at least one seal 86. An elastomer seal is preferably provided.

The passage 77, on the connection side 78, is part of a connection port 88. This connection port 88 has at its front end an internal insertion chamfer 89 which merges into the passage 77. The passage 77 is preferably in the form of a cylindrical hole with a constant cross section. Surrounding the connection port 88 externally, a free annular space 91 is provided in the housing 75. The annular space 91 is preferably U-shaped. This annular space 91 is oriented so as to be open to the connection side 78. At least one seal 92, 93 is provided on the outer circumference of the connection port 88 and facing into the annular space 91. Associated with the end face of the connection port 88, a powder scraper is preferably provided as the seal 92 and, with the seal 93 located behind it, is in the form of a gas sealing. On the connection side 78 of the housing 75 there is provided a housing cover 95 by which the connection port 88 can be closed. This housing cover 95 is preferably in the form of a slidable cover which covers both the annular space 91 and the connection port 88—that is to say on the connection side 78. The housing cover 95 can further be sealed with respect to the surrounding area by means of a seal for the building material, in particular a felt wiper. This seal can be provided facing the annular space 91 and/or facing outwards to the surrounding area.

A handgrip 97 is further provided in the housing 95 of the connecting device 48. This handgrip 97 is fastened so that it is oriented towards the connection side 78. The handgrip 97 is preferably oriented parallel to the longitudinal axis 84 of the passage 77. The slidable housing cover 95 is preferably received on an underside of the handgrip 97, and a carrier element 96 can be provided on the housing cover 95 so that automatic opening and closing of the connecting device 48 is activatable.

FIG. 5 shows the connecting device 48 according to FIG. 2 in a sectional view, wherein the closure flap 82 is shown in an open position. Furthermore, the housing cover 95 is open. A passage between the cartridge receiver 74 and the connection port 88 is thus freed.

FIG. 6 shows, schematically, an arrangement for connecting the connecting device 48 to the cartridge container 49. A cover 53 of the cartridge container 49 is removed. In an upside-down arrangement, the connecting device 48 is positioned with the cartridge receiver 74 at the opening of the cartridge container 49. The cartridge container 49 is then connected to the connecting device 48. The closure member 81 and the housing cover 95 are in a closed position. If the cartridge container 49 is filled with building material 14, a marking 98 attached to the cartridge container 49 or the marking 98 attached to the cover 53 can then be read out by means of an electrical device. This marking 98 can be in the form of a NFC/RFID tag (NFC—near field communication, RFID—radio frequency identification), which is preferably attached by adhesive bonding. A colored marking corresponding to the building material 14 provided can be fastened to a holder 99 on the handgrip 97.

Furthermore, a further marking 73 can preferably be provided on an outer side of the cartridge receiver 74. This marking can be, for example, a RFID chip which is writable and/or readable. For example, this marking 73 can contain information as to whether a full or empty cartridge container 49 has been connected to the cartridge receiver 74, for example. Furthermore, information as to whether the cartridge container 49 contains fresh, processed or cleaned building material 14 can be stored. Further data can likewise be read in, so that the necessary information can be read out at every process step. For example, a comparison between the marking 98 and the further marking 73 can be carried out in order to determine whether there is a permissible combination of features or whether features match. It is thus possible to prevent a cartridge receiver 74 that in a preceding process was exposed to an aluminum powder, for example, and a cartridge container 49 that contains a building material 14 of noble metal, for example, from being connected together, since such a material mixture can lead to a risk of ignition.

By interrogation of the respective markings 73 and 98, an increase in the process reliability can be achieved.

By means of the marking 98, it is possible to ascertain at a later point in time what building material 14 is in the cartridge container 49. The connecting device 48 with the cartridge container 49 fastened thereto is then rotated through 180° and can then be inserted into a feeding station 52. The housing cover 95 is thereby opened first so that the connection port 88 is accessible for connection to the connection point 50.

In FIG. 7, the connecting device 48 with the cartridge container 49 fastened thereto is oriented towards the feeding station 52. The feeding station 52 can be connected to a powder storage funnel 42, for example. The feeding station 52 comprises a docking port 101. This docking port 101 can be moved up and down relative to a guide 116 of the feeding station 52. In a starting position, the docking port 101 is arranged in a lower position. The connecting device 48 can thus be oriented in a simple manner relative to the connection point 50 of the feeding station 52. For example, the connecting device 48 can be stored in a magazine 120. The magazine 120 can transfer the connecting device 48 with the filled cartridge container 49 into an emptying position 126 at the feeding station 52 by a sliding movement or a rotation.

Once the connecting device 48 has assumed the unloading position 126 at the docking port 101 in the feeding station 52, a displacement movement of the docking port 101 vertically upwards is activated, so that the docking port 101 is fitted to the connection port 88. The docking port 101 is configured to be larger in circumference than the connection port 88, so that the connection port 88 engages into the docking port 101. By means of the seals 92, 93 provided on the outer circumference of the connection port 88, automatic sealing with respect to the docking port 101 is thus created when the connection port 88 is inserted in the docking port 101.

The docking port 111 comprises a passage 114. This passage 114 can open into the powder storage funnel 42, for example. A closure member 103 is provided in the passage 114. This closure member 103 has a closure flap 82 which is analogous and/or corresponds to the closure member 81 of the connection port 88. This docking port 101 can also be part of the powder storage funnel 42. At the time of fitting of the connecting device 48 to the feeding station 52 or at the time of displacement of the connecting device 48 with the magazine 120 into the emptying position 126 at the feeding station 52, the closure member 103 in the docking port 101 is closed, as is the closure member 81 in the connecting device 48. After the connection port 81 has been connected to the docking port 101, a closed lock 115 is formed. This lock 115 is formed on the one hand by the closure member 81 in the connecting device 48 and on the other hand by the closure member 103 in the docking port 101 of the feeding station 52.

For transferring the building material 14 from the cartridge container 49 into the powder storage funnel 42, the closure member 103 is first opened. The closure member 103 can be rotatably activated by a motor 121 for opening. This motor 121 is connected via a coupling 122 to the pivot pin 83 of the closure member 103, as is apparent by way of example from FIG. 6. By opening the closure member 103, the air compressed between the two closure members 81, 103 can be discharged into the powder storage funnel 42. The closure member 81 in the connecting device 88 is then opened. For opening the closure member 81, a motor 124 is activated. On the motor 124 there is provided a gripping coupling 125, which is U-shaped. The driver member 85 of the closure member 81 of the connection port 88 is rectangular in form. In the closed position of the closure member 81, the long side of the driver member 83 is oriented horizontally, so that, when the magazine 120 is moved into the emptying position 126, the driver member 85 is introduced into the gripping coupling 125. Alternatively, a sliding movement can first be activated, so that a drive shaft of the motor 124 engages the driver member 85 of the pivot pin 83 of the closure member 81 in order to transfer the closure member from a closed position into an open position shown in FIG. 5.

As a result of the engagement of the connection port 88 into the docking port 101, an arrangement without undercuts—when seen in the direction of flow of the building material 14—is created between the cartridge container 49 and, for example, the powder storage funnel 42. The powdered building material 14 flows through the feeding station 52 independently, without resulting in an accumulation of building material.

After the cartridge container 49 has been emptied, first the closure member 103 in the docking port 101 and then the closure member 81 in the connecting device 48 is closed. The connecting device 48 is then removed and the housing cover 95 is closed. Alternatively, the magazine 120 can be advanced, so that the connecting device 48 with the emptied cartridge container 49 is transferred into a loading/unloading position 128.

FIG. 8 shows a schematic sectional view of the connecting device 48 with an empty cartridge container 49, which is associated with a connection point 50 of an emptying station 51, for example in the building station 16, the unpacking station 18 and/or the sieve station 66. The emptying station 51 has a docking port 111 with a passage 114. This passage 114 has a closure member 113, by means of which the passage 114 is opened and closed. This closure member 113 can comprise a closure flap 82, which can correspond to the closure flap 82 of the closure member 81 of the connection port 88. Preferably, the closure member 113 is configured analogously to the closure member 81 in respect of the pivot pin of the seal and the activation for opening and closing. The closure member 113 in the docking port 111 of the emptying station 51 is closed in a starting position. Before the connecting device 48 is connected to the connection point 50 of the emptying station 51, the closure member 81 of the connecting device 48 is closed.

The docking port 111 of the emptying station 51 can be moved up and down by a guide 116. In a starting position of the docking port 111, the docking port is arranged in an upper position and a housing cover 118 is preferably closed. In preparation for an emptying process, the housing cover 118, where present, is opened. The connecting device 48 is then positioned at the connection point 50 of the emptying station 51. This can also be carried out by advancing the connecting device 48 arranged in the magazine 120. The docking port 111 is then preferably brought to the connection port 88 and they are connected together.

There is thus formed a closed lock 115 and the closure member 113 in the docking port 111. The docking port 111 of the emptying station 51 is configured to be smaller in diameter than the connection port 88, so that this docking port 111 engages into the connection port 88. Advantageously there are provided on the outer circumference of the docking port 111, analogously to the connection port 88, a powder scraper as the seal 92 and a gas sealing as the seal 93.

For filling the cartridge container 49, first the closure member 81 of the connecting device 48 and then the closure member 113 of the docking port 111 is opened. For opening the closure member 81, the motor 124 is activated. For example, a displacement movement of the motor 124 towards the pivot pin 83 can take place, so that a drive shaft engages the driver member 85 with a coupling on the motor 124. Alternatively, the connection can take place as described in relation to FIG. 5 in the case of the feeding station 52. The opening and closing movement of the closure member 113 in the docking port 111 is activated via the motor 121, which is connected to the driver member 85 via a coupling 122, for example. In this embodiment it is provided that the motor 121 can be moved up and down together with the docking port111. After the closure members 81, 113 have been opened, a predetermined amount of processed or cleaned building material 14 is delivered by the metering device 43. When seen in the direction of flow of the building material 14, an undercut-free arrangement can again be formed by the arrangement of the docking port 111 within the connection port 88, so that an accumulation of building material 14 in dead spaces is avoided.

After the cartridge container 49 has been filled with processed or cleaned building material 14, preferably first the closure member 113 in the docking port 111 of the emptying station 51 and then the closure member 81 in the connecting device 48 is closed. This order can also be reversed. The connecting device 48 is then removed from the connection point 50 and the housing cover 95 is closed again. Alternatively, the connecting device 48 with the filled cartridge container 49 can be transferred by the magazine 120 into the loading/unloading position 128. Preferably, the docking port 111 in the emptying station 51 can be moved upwards, so that this connection point 50 at least can be closed with a housing cover 51.

| | |
|---|---|
| 10. | Installation |
| 11. | |
| 12. | Component |
| 13. | |
| 14. | Building material |
| 15. | |
| 16. | Building station |
| 17. | |
| 18. | Unpacking station |
| 19. | Housing |
| 20. | Beam guide |
| 21. | Beam source |
| 22. | Beam |
| 23. | Beam deflection device |
| 24. | Process chamber |
| 25. | |
| 26. | Processing head |
| 27. | |
| 28. | |
| 29. | |
| 30. | |
| 31. | Work surface |
| 32. | |
| 33. | Build module |
| 34. | Substrate plate |
| 35. | |
| 36. | Application and levelling device |
| 37. | |
| 38. | |
| 40. | |
| 41. | Powder storage device |
| 42. | Powder storage funnel |
| 43. | Metering device |
| 44. | Metering screw |
| 45. | |
| 46. | Collecting device |
| 47. | Collecting funnel |
| 48. | Connecting device |
| 49. | Cartridge container |
| 50. | Connection point |
| 51. | Emptying station |
| 52. | Feeding station |
| 53. | Cover |
| 54. | Storage place |
| 61. | Unpacking chamber |
| 62. | |
| 63. | Openings |
| 64. | |
| 65. | |
| 66. | Sieve station |
| 67. | Sieve device |
| 68. | Sieve |
| 69. | Oversized-particle container |
| 71. | Outlet opening |
| 72. | |
| 73. | Marking |
| 74. | Cartridge receiver |
| 75. | Housing |
| 76. | Funnel |
| 77. | Passage |
| 78. | Connection side |
| 81. | Closure member |
| 82. | Closure flap |
| 83. | Pivot pin |
| 84. | Longitudinal axis of 77 |
| 85. | Driver member |
| 86. | Sealing |
| 88. | Connection port |
| 89. | Insertion chamfer |
| 91. | Annular space |
| 92. | Seal |
| 93. | Seal |
| 95. | Housing cover |
| 96. | Driver element |
| 97. | Handgrip |
| 98. | Marking |
| 99. | Holder |
| 101. | Docking port |
| 103. | Closure member |
| 111. | Docking port |
| 113. | Closure member |

-continued

| | |
|---|---|
| 114. | Passage |
| 115. | Lock |
| 116. | Guide |
| 118. | Housing cover |
| 119. | Storage device |
| 120. | Magazine |
| 126. | Emptying position |
| 127. | Filling position |
| 128. | Loading/unloading position |
| 130. | Storage disc |
| 131. | Storage location |
| 132. | Storage location |
| 133. | Storage location |
| 134. | Storage location |
| 135. | Storage location |
| 140. | Bearing |
| 141. | Holding device |
| 142. | Opening |
| 144. | Drive |
| 146. | Loading/unloading station |
| 147. | Interrogator device |

The invention claimed is:

1. A storage device for cartridge containers in an installation for producing a three-dimensional component by selective solidification by means of a beam acting on a powdered building material, having a magazine which has a plurality of storage locations for receiving cartridge containers and which is transferable at least to an emptying/feeding station and to a loading/unloading station, having a holding device provided at each storage location, by means of which the cartridge container is fixed to the storage location in an exchangeable manner, having an opening provided in the storage location, by means of which a docking port of the emptying/feeding station is connectable to the cartridge container, and having a drive which activates a change of the storage locations by a displacement movement of the magazine at least between an emptying/filling position of the emptying/feeding station and the loading/unloading station, wherein the feeding station has a docking port which is oriented facing the magazine and comprises a passage in which a closure member for opening and closing the passage is provided, wherein the docking port of the feeding station is arranged in a lower starting position in a guide and, after the filled cartridge container has been positioned by the drive of the magazine in the emptying position of the feeding station, the docking port is connected to the connection port of the connecting device, and wherein the docking port, by means of a displacement movement by another drive in an upward direction towards the connection port, is fitted and positioned engaging around the connection port externally and the powder material is flowable from the cartridge container through the feeding station.

2. The storage device according to claim 1, wherein the magazine has at least two storage locations and each storage location is moveable into the emptying position of the emptying station or into the filling position of the feeding station and into a loading/unloading position of the loading/unloading station.

3. The storage device according to claim 1, wherein the loading/unloading station is arranged downstream of the emptying/feeding station.

4. The storage device according to claim 1, wherein a plurality of storage locations for keeping cartridge containers available are provided between the loading/unloading position and the emptying position or filling position.

5. The storage device according to claim 1, wherein there is associated with the emptying/feeding station an interrogator device which detects the presence of a cartridge container and/or a marking on the cartridge container.

6. The storage device according to claim 1, wherein the storage device is configured to operate autonomously during a production cycle without handling by a worker.

7. The storage device according to claim 1, wherein the holding device is provided for receiving a connecting device which is fixed by a connection side of the connecting device in the storage location and receives the connection side opposite the cartridge container.

8. The storage device according to claim 7, wherein the holding device forms with the housing of the connecting device a plug/latching connection or a bayonet closure.

9. The storage device according to claim 7, wherein the connecting device has a housing with a cartridge receiver and a connection port opposite the connection side, which connection port comprises a passage which is activatable for opening and closing by a closure member.

10. The storage device according to claim 9, wherein the closure member is in the form of a closure flap which is arranged in the passage and is mounted so as to be rotatable about a pivot pin in the housing.

11. The storage device according to claim 10, wherein the closure member of the connection port has the pivot pin extending outside the housing and having a driver member which is connectable to a drive.

12. The storage device according to claim 10, wherein the pivot pin of the closure flap is mounted in the housing and is sealed facing the passage by at least one seal.

13. The storage device according to claim 7, wherein the connection port is surrounded by a free, annular space which is configured to be open to the connection side of the housing.

14. The storage device according to claim 13, wherein at least one seal surrounding the connection port is provided on the outer circumference of the connection port and facing into the free annular space.

15. A storage device for cartridge containers in an installation for producing a three-dimensional component by selective solidification by means of a beam acting on a powdered building material, having a magazine which has a plurality of storage locations for receiving cartridge containers and which is transferable at least to an emptying/feeding station and to a loading/unloading station, having a holding device provided at each storage location, by means of which the cartridge container is fixed to the storage location in an exchangeable manner, having an opening provided in the storage location, by means of which a docking port of the emptying/feeding station is connectable to the cartridge container, and having a drive which activates a change of the storage locations by a displacement movement of the magazine at least between an emptying/filling position of the emptying/feeding station and the loading/unloading station, wherein the emptying station has a docking port which is oriented facing the magazine and comprises a passage in which a closure member for opening and closing the passage is provided, and wherein the docking port of the emptying station is arranged in an upper starting position in a guide and, after the emptied cartridge container has been positioned by the drive of the magazine in the filling position of the emptying station, the docking port is connected to the connection port of the connecting device and the docking port, by means of a displacement movement by another drive towards the connection port, engages into the connection port and the powder material is flowable through the emptying station into the cartridge container.

* * * * *